United States Patent
Bottorff et al.

(10) Patent No.: US 9,614,777 B2
(45) Date of Patent: Apr. 4, 2017

(54) FLOW CONTROL IN A NETWORK

(75) Inventors: Paul Allen Bottorff, Portola Valley, CA (US); Charles L Hudson, Round Rock, TX (US); Michael Schlansker, Los Altos, CA (US); Stephen G Low, Austin, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/422,348

(22) PCT Filed: Aug. 21, 2012

(86) PCT No.: PCT/US2012/051724
§ 371 (c)(1),
(2), (4) Date: Feb. 18, 2015

(87) PCT Pub. No.: WO2014/031105
PCT Pub. Date: Feb. 27, 2014

(65) Prior Publication Data
US 2015/0229575 A1  Aug. 13, 2015

(51) Int. Cl.
*H04L 12/801* (2013.01)
*H04L 12/863* (2013.01)

(52) U.S. Cl.
CPC ............. *H04L 47/37* (2013.01); *H04L 47/12* (2013.01); *H04L 47/29* (2013.01); *H04L 47/62* (2013.01)

(58) Field of Classification Search
CPC ........................................ H04L 47/00–47/829
See application file for complete search history.

(56) References Cited

U.S. PATENT DOCUMENTS

| 6,170,022 B1 | 1/2001 | Linville et al. |
| 7,039,011 B1 * | 5/2006 | Badt, Jr. ............ H04L 47/263 370/230 |
| 7,061,868 B1 | 6/2006 | Ahlfors et al. |
| 7,561,590 B1 | 7/2009 | Walsh |
| 7,675,857 B1 | 3/2010 | Chesson |

(Continued)

FOREIGN PATENT DOCUMENTS

WO  WO2011-036001  3/2011

OTHER PUBLICATIONS

Abdul Kabbani, Algorithms for Congestion Control & Bandwidth-Partitioning in Data Centers, Dec. 2011, pp. 1-97.*

(Continued)

*Primary Examiner* — Michael Thier
*Assistant Examiner* — Prince A Mensah
(74) *Attorney, Agent, or Firm* — Dicke, Billig & Czaja, PLLC

(57) ABSTRACT

One example provides a network device including a queue to receive frames from a source, a processor, and a memory communicatively coupled to the processor. The memory stores instructions causing the processor, after execution of the instructions by the processor, to determine whether a flow control threshold of the queue has been exceeded, and in response to determining that the flow control threshold of the queue has been exceeded, generate a message to be sent to the source of the frame that exceeded the flow control threshold. The message includes a pause duration for which the source is to stop transmitting frames.

13 Claims, 7 Drawing Sheets

(56) References Cited

U.S. PATENT DOCUMENTS

| | | | |
|---|---|---|---|
| 7,688,736 B1 | 3/2010 | Walsh | |
| 7,961,606 B2 | 6/2011 | Cunningham | |
| 8,004,976 B2 | 8/2011 | Janarthanan et al. | |
| 8,457,138 B1* | 6/2013 | Boling | H04L 47/2491 370/230 |
| 2002/0136163 A1* | 9/2002 | Kawakami | H04L 47/26 370/229 |
| 2004/0022187 A1* | 2/2004 | She | H04L 12/40013 370/229 |
| 2006/0120289 A1* | 6/2006 | Cunningham | H04L 47/10 370/235 |
| 2009/0268612 A1* | 10/2009 | Felderman | H04L 47/10 370/230 |
| 2011/0235518 A1* | 9/2011 | Halabi et al. | H04L 47/263 370/237 |
| 2012/0099475 A1* | 4/2012 | Tokuoka | H04L 12/5696 370/253 |
| 2012/0106376 A1* | 5/2012 | Kikkawa | H04L 47/193 370/252 |
| 2012/0140626 A1 | 6/2012 | Anand et al. | |
| 2012/0307829 A1* | 12/2012 | Hyoudou | H04L 47/17 370/392 |
| 2013/0077489 A1* | 3/2013 | Bloch | H04L 47/39 370/235 |
| 2013/0117605 A1* | 5/2013 | Ziegler | H04L 69/40 714/15 |
| 2013/0208593 A1* | 8/2013 | Nandagopal | H04L 47/00 370/232 |

OTHER PUBLICATIONS

Anghel, A.S. et al, "Cross-Layer Flow and Congenstion Control for Datacenter Networks", Proceddings fo the 2011 3rd Wordshop of Data Center—converged and Virtua Ethernet Switching 2011 pp. 44-62.

Sally Floyd, et al., "Random Early Detection Gateways for Congestion Avoidance"; University of California; IEEE ACM Transactions on Networking; Aug. 1993; 22 pages.

PCT Notification Concerning Transmittal of International Preliminary Report on Patentability (Chapter I of the Patent Cooperation Treaty); PCT/US2012/051724; Aug. 21, 2012; 7 pages.

PCT Notification of Transmittal of the International Search Report and the Written Opinion of the International Searching Authority, or the Declaration; PCT/US2012/051724; Aug. 21, 2012; 10 pages.

Masato Yasuda et al., "Data Center Quantized Congestion Notification (QCN): Implementation and Evaluation on NetFPGA"; Jun. 14, 2010; 23 pages.

M. Allman et al., Purdue University, Network Working Group, Request for Comments: 5681, Obsoletes: 2581, Category: Standards Track, "TCP Congestion Control", Sep. 2009, 18 pages.

* cited by examiner

FLOW CONTROL IN A NETWORK

CROSS-REFERENCE TO RELATED APPLICATION

This application is a national stage application under 35 U.S.C. §371 of PCT/US2012/51724, filed Aug. 21, 2012.

BACKGROUND

Data traffic congestion is a common problem in computer networks. Conventional congestion control methods include Transmission Control Protocol (TCP) congestion control, such as Random Early Detection (RED), Weighted RED (WRED), and Quantized Congestion Notification (QCN), which is standardized as Institute of Electrical and Electronics Engineers (IEEE) Standard 802.1 ua-2010. Both of these congestion control methods rely on rate adaption of the source based on feedback from the congestion point within the network. For RED congestion control, the feedback indicating congestion is typically provided by using packet discard. For QCN congestion control, the feedback indicating congestion includes explicit information about the rate of overload and the information is delivered to the flow source using a backward congestion notification message.

These and other conventional congestion control methods require relatively long times to settle a flow to a stable rate. With the delay bandwidth product of networks increasing more rapidly than the available switch buffer and with large transient traffic loads, these conventional congestion control methods do not provide adequate buffer control for high speed networks, such as datacenters.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined with each other, unless specifically noted otherwise.

Figure 1:
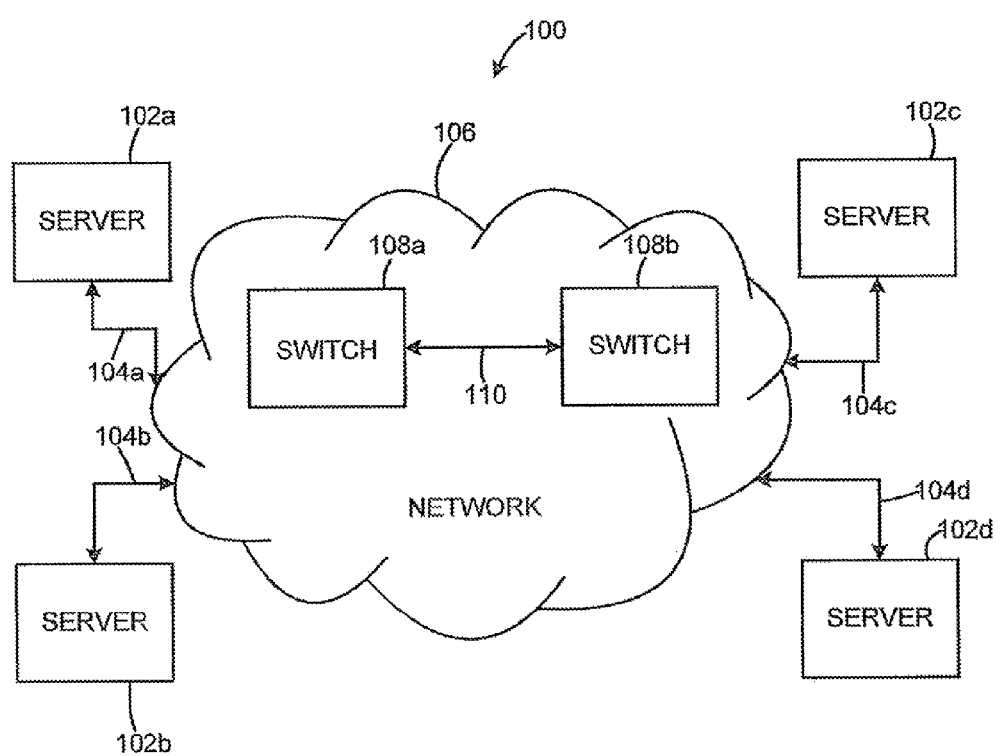
FIG. 1 is a block diagram illustrating one example of a network system.

FIG. 1 is a block diagram illustrating one example of a network system 100. Network system 100 includes a plurality of network devices. In particular, network system 100 includes a plurality of servers including servers 102a-102d and a switching network 106. Switching network 106 includes a plurality of interconnected switches including switches 108a and 108b. Switch 108a is communicatively coupled to switch 108b through communication link 110. Each server 102a-102d is communicatively coupled to switching network 106 through communication links 104a-104d, respectively. Each server 102a-102d may communicate with each of the other servers 102a-102d through switching network 106. In one example, network system 100 is a datacenter.

Network system 100 utilizes a congestion control method. In particular, network system 100 utilizes a quantum flow control method for low loss traffic management. The quantum flow control method is specifically adapted for low latency networks (e.g., datacenters) and uses quantized pause intervals applied at a fine grained flow level. The pause quantum, which is the time interval for draining a particular buffer within the network, is determined at the point of congestion and is reported to a selected flow source using a flow control notification message. The flow control notification message can be a backward flow control notification message or a forward flow control notification message. A buffer is determined to be overloaded based on a buffer utilization threshold while the pause quantum is determined based on estimates of the buffer drain rate. The flow source reacts to flow control notification messages by stopping all forward traffic for the specified time interval determined at the congestion point. The congestion point within the network continues to send flow control notification messages to selected flow sources as long as the buffer utilization threshold is exceeded.

Figure 2:
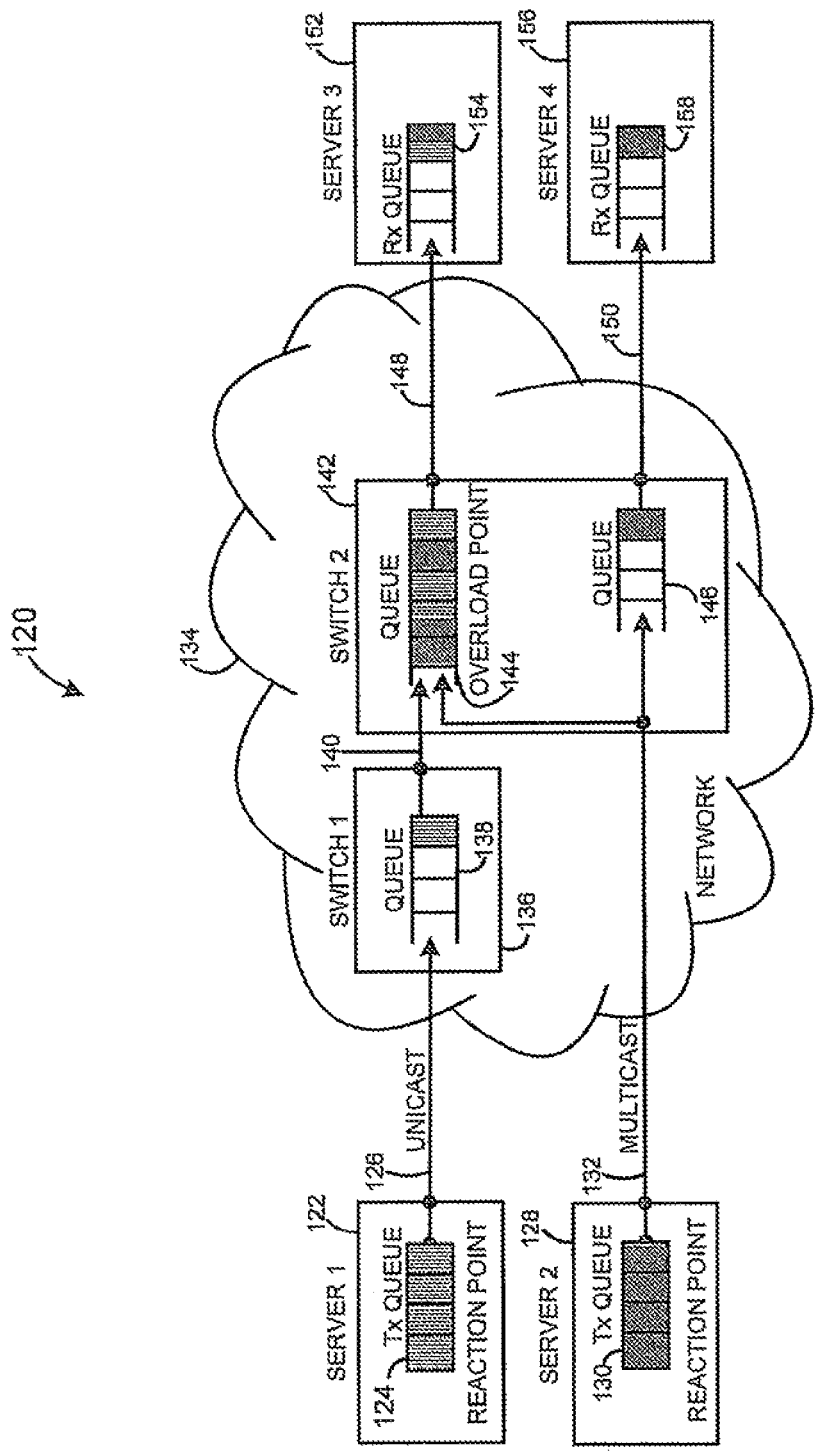
FIG. 2 is a diagram illustrating one example of traffic flowing through a network system.

FIG. 2 is a diagram illustrating one example of traffic flowing through a network system 120. In one example, network system 120 is a layer 2 network. Network system 120 includes a first server 122, a second server 128, a third server 152, a fourth server 156, and a switching network 134. Switching network 134 includes a first switch 136 and a second switch 142. First server 122 is communicatively coupled to first switch 136 through communication link 126. First switch 136 is communicatively coupled to second switch 142 through communication link 140. Second server 128 is communicatively coupled to second switch 142 through communication link 132. Second switch 142 is communicatively coupled to third server 152 through communication link 148 and to fourth server 156 through communication link 150.

In this example, first server 122 is a reaction point (i.e., a source of frames) and includes a transmitter queue 124. Second server 128 is also a reaction point and includes a transmitter queue 130. First switch 136 includes a queue 138, and second switch 142 includes a first queue 144 and a second queue 146. Third server 152 is a destination for frames and includes a receiver queue 154. Fourth server 156 is also a destination for frames and includes a receiver queue 158. In one example, transmitter queues 124 and 130, queues 138, 144, and 146, and receiver queues 154 and 158 are First In First Out (FIFO) queues.

In this example, first server 122 is sending a unicast message to third server 152. Frames in transmitter queue 124 are transmitted to first switch 136, and the transmitted frames are received in queue 138. The frames in queue 138 are forwarded by first switch 136 to second switch 142, and the forwarded frames are received in first queue 144. The frames in first queue 144 from first server 122 are then forwarded by second switch 142 to third server 152, and the forwarded frames are received in receiver queue 154. Second server 128 is sending a multicast message to third server 152 and fourth server 156. Frames in transmitter queue 130 are transmitted to second switch 142, and the transmitted frames are received in both first queue 144 and second queue 146. The frames in second queue 146 are forwarded to fourth server 156, and the forwarded frames are received in receiver queue 158. The frames in first queue 144 from second server 128 are then forwarded by second switch 142 to third server 152, and the forwarded frames are received in receiver queue 154.

In this example, first queue 144 of second switch 142 is an overload point due to the merging of frames transmitted from first server 122 and second server 128. In other examples, an overload point may occur due to frames from a single source or due to the merging of frames from three or more sources. To address this congestion at overload points within a network system, quantum flow control as disclosed herein is utilized.

Figure 3:
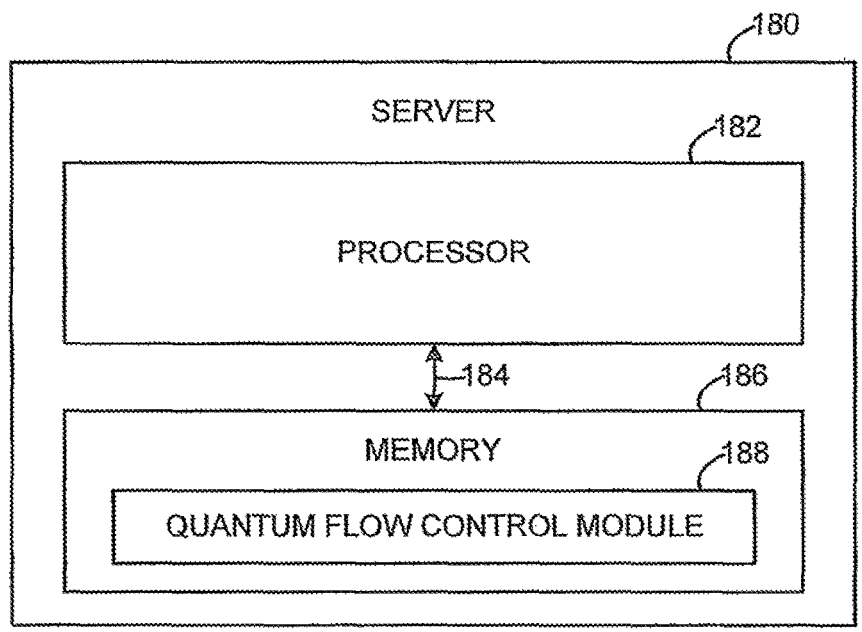
FIG. 3 is a block diagram illustrating one example of a server.

FIG. 3 is a block diagram illustrating one example of a server 180. In one example, server 180 provides each server 102a-102d previously described and illustrated with reference to FIG. 1 and first server 122, second server 128, third server 152, and fourth server 156 previously described and illustrated with reference to FIG. 2. Server 180 includes a processor 182 and a memory 186. Processor 182 is communicatively coupled to memory 186 through communication link 184.

Processor 182 includes a Central Processing Unit (CPU) or other suitable processor. In one example, memory 186 stores instructions executed by processor 182 for operating server 180. Memory 186 includes any suitable combination of volatile and/or non-volatile memory, such as combinations of Random Access Memory (RAM), Read-Only Memory (ROM), flash memory, and/or other suitable memory. Memory 186 stores instructions executed by processor 182 including instructions for a quantum flow control module 188. In one example, processor 182 executes instructions of quantum flow control module 188 to implement the congestion control method disclosed herein. In other examples, quantum flow control is implemented by hardware state machines rather than by processor 182.

Figure 4:
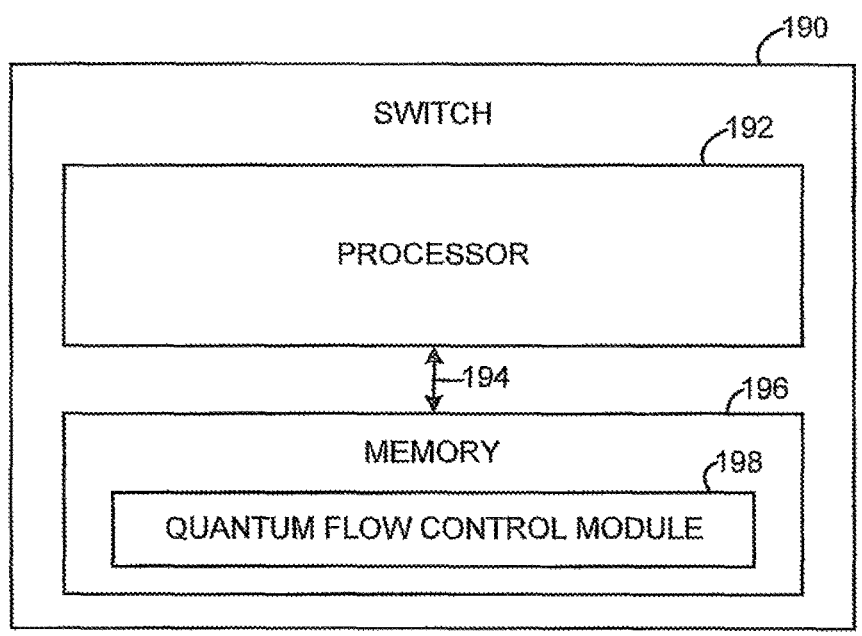
FIG. 4 is a block diagram illustrating one example of a switch.

FIG. 4 is a block diagram illustrating one example of a switch 190. In one example, switch 190 provides each switch 108a and 108b previously described and illustrated with reference to FIG. 1 and first switch 136 and second switch 142 previously described and illustrated with reference to FIG. 2. Switch 190 includes a processor 192 and a memory 196. Processor 192 is communicatively coupled to memory 196 through communication link 194.

Processor 192 includes a CPU or other suitable processor. In one example, memory 196 stores instructions executed by processor 192 for operating switch 190. Memory 196 includes any suitable combination of volatile and/or non-volatile memory, such as combinations of RAM, ROM, flash memory, and/or other suitable memory. Memory 196 stores instructions executed by processor 192 including instructions for a quantum flow control module 198. In one example, processor 192 executes instructions of quantum flow control module 198 to implement the congestion control method disclosed herein. In other examples, quantum flow control is implemented by hardware state machines rather than by processor 192.

Figure 5:
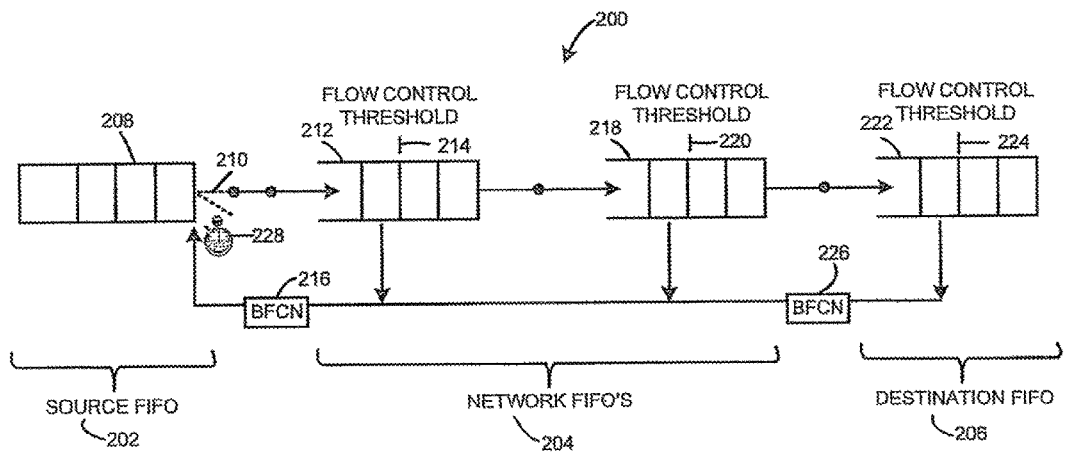
FIG. 5 is a diagram illustrating one example of quantum flow control.

FIG. 5 is a diagram illustrating one example of quantum flow control 200. Quantum flow control 200 involves source queues or FIFO's, such as FIFO 202, network queues or FIFO's, such as FIFO's 204, and destination queues or FIFO's, such as FIFO 206. In this example, a source device, such as a server, transmits frames in a source FIFO 208, and the transmitted frames are received in a network FIFO 212 of a forwarding device, such as a switch. The frames in network FIFO 212 are forwarded, and the forwarded frames are received in a network FIFO 218 of another forwarding device. The frames in network FIFO 218 are again forwarded, and the forwarded frames are received in a destination FIFO 222 of a destination device, such as a server.

Network FIFO 212 has a flow control threshold 214. If a frame from source FIFO 208 exceeds the flow control threshold 214 of network FIFO 212, a Backward Flow Control Notification (BFCN) message is generated as indicated at 216. In one example, a backward flow control notification message is generated for each frame that exceeds the flow control threshold 214 of network. FIFO 212. Network FIFO 218 has a flow control threshold 220. If a forwarded frame from source FIFO 208 exceeds the flow control threshold 220 of network FIFO 218, a backward flow control notification message is generated as indicated at 216. A backward flow control notification message is generated for each frame that exceeds the flow control threshold 220 of network FIFO 218. Likewise, destination FIFO 222 has a flow control threshold 224. If a forwarded frame from source FIFO 208 exceeds the flow control threshold 224 of destination FIFO 222, a backward flow control notification message is generated as indicated at 226. A backward flow control notification message is generated for each frame that exceeds the flow control threshold 224 of destination. FIFO 222.

Each backward flow control notification message 216 and 226 includes a pause duration, which is the time for draining the overloaded FIFO. For example, the pause duration included in a backward flow control notification message generated in response to the flow control threshold 214 of network. FIFO 212 being exceeded is a time interval long enough for draining network FIFO 212. Likewise, the pause duration included in a backward flow control notification message generated in response to the flow control threshold 224 of destination FIFO 222 being exceeded is a time interval long enough for draining destination FIFO 222. Each backward flow control notification message is transmitted to the source of the frame that caused the flow control threshold of the FIFO to be exceeded. In this example, each backward flow control notification message 216 and 226 is transmitted to the source device transmitting frames from source FIFO 208.

In response to receiving a backward flow control notification message, the source stops transmitting for the pause duration. In this example, in response to each backward flow control notification message 216 and 226, the source stops transmitting frames (as indicated for example by switch 210) from source FIFO 208 for the pause duration (as indicated by stopwatch 228). If transmission from a source FIFO is currently halted by a previous backward flow control notification message when another backward flow control notification message is received, the pause duration is reset to the maximum of the remaining pause duration and the new pause duration.

A quantum flow control reaction point (i.e., source FIFO 208 in this example) transmits at full speed until the reaction point receives a backward flow control notification message at which time the reaction point stops transmitting entirely for the pause duration (i.e., no slow start). Rate limiting at the quantum flow control reaction point is not directly affected by backward flow control notification messages. In one example, quantum flow control shapes the traffic flow to a provisioned max information rate. In another example, the max information rate is dynamically adjusted by taking measurements of the throughput over periods of time when the source FIFO is backing up and then adjusting the max information rate to match.

Figure 6:
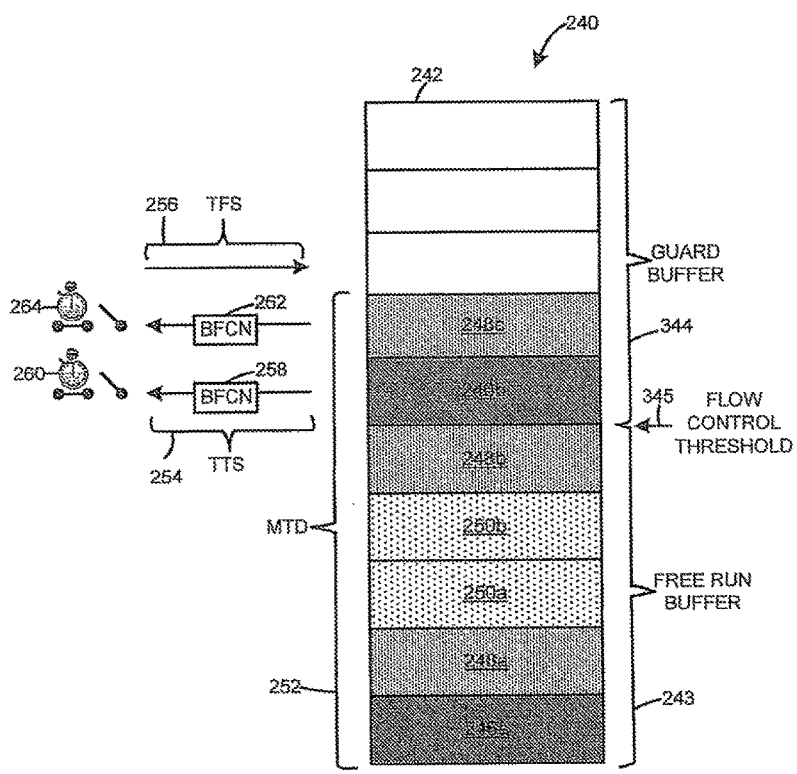
FIG. 6 is a diagram illustrating one example of an overload point.

FIG. 6 is a diagram illustrating one example of an overload point 240. In this example, three flows are merging into a FIFO 242. The three flows are indicated by frames 246a-246b from a first source, frames 248a-248c from a second source, and frames 250a-250b from a third source. FIFO 242 includes a free run buffer portion 243 and a guard buffer portion 344. Free run buffer portion 243 is below a flow control threshold 345, while guard buffer 344 is above flow control threshold 345.

Below flow control threshold 345, the frames pass without generating any backward flow control notification messages. In this example, frames 246a, 248a, 250a, 250b, and 248b pass without generating any backward flow control notification messages. Above flow control threshold 345, every new frame results in the generation of a backward flow control notification message. In another example, duplicate backward flow control notification messages are filtered at the overload point. In this example, frame 246b results in the generation of backward flow control notification message 258, and frame 248c results in the generation of backward flow control notification message 262.

Each backward flow control notification message 258 and 262 includes a pause duration as indicated by stopwatches 260 and 264, respectively. The pause duration is determined based on three components. The first component is the Maximum Time To Drain (MTD) the overloaded FIFO as indicated at 252. The second component is the Time To Source (TTS) from the overloaded FIFO as indicated at 254. The third component is the Time From Source (IFS) to the overloaded FIFO as indicated at 256. MTD can be calculated from the number of octets in the FIFO and the minimum guaranteed FIFO bandwidth. TTS is the latency for delivering a backward flow control notification message from the overloaded FIFO to the source FIFO. TFS is the latency for delivery of traffic from the source FIFO to the overloaded FIFO.

In one example, TTS and TFS are the sums of the hop and transmission delays. In a datacenter network, the transmission delay is insignificant relative to the hop delay. For unloaded FIFO's, the minimum hop delay equals one store-and-forward frame time plus switch pipeline delay (i.e., time from last bit in to last bit out). If, for example, the FIFO service rate is 10 Gbits and backward flow control notification messages are transmitted on an uncongested path and each backward flow control notification message is 672 bits on the wire, then the minimum hop delay for TTS=(672 bits*100 psec/bit)+500 nsec pipeline delay, for example)=567 nsec/hop. Therefore, for four hops, TTS=2268 nsec. If, for example, the FIFO service rate is 10 Gbits and data frames are transmitted on an uncongested path and the average data frame size is 1K octets (bimodal distribution of 2048 and 64 octets), the minimum hop delay for TFS=(8608 bits*100 psec/bit)+(500 nsec pipeline delay, for example)=1361 nsec/hop. Therefore, for four hops, TFS=5444 nsec. The 500 nsec pipeline delay is provided as an example. The actual pipeline delay may vary based on the implementation.

The guard buffer 344 is sufficient for quantum flow control at an overload point. With for example, a source rate to delivery miss-match of 4 Gbits/sec and TTS and TFS as approximated in the above example, one delay bandwidth product or a minimum of (TTS+TFS)*4 Gbits/sec=(2268 nsec+5444 nsec) 4 Gbits/sec=30,848 bits=3856 octets. Datacenter network switches, for example, may operate with about 256K octets/port divided between the FIFO's per port. The 256K octets/port is provided as an example and may vary based on the actual implementation. For 8 FIFO's per port, there are 32K octets per FIFO per port or about thirty 1056 octet frames. In one example, pooling the port buffers per FIFO allows sufficient reserve to provide the guard buffer. For 32 ports with 8 FIFO's each, for example, there is a total of 1 Mbyte/FIFO set. Setting the flow control threshold at 32 Kbytes will keep the operation at the buffer/port/FIFO limit.

Figure 7:
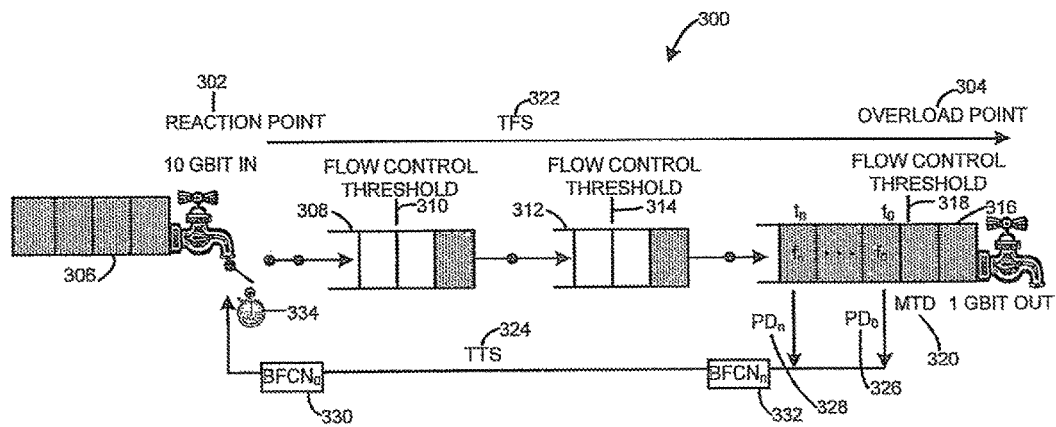
FIG. 7 is a diagram illustrating one example of quantum flow control for a rate mismatch between a reaction point and an overload point.

FIG. 7 is a diagram illustrating one example of quantum flow control 300 for a rate mismatch between a reaction point 302 and an overload point 304. Reaction point 302 transmits frames in a source FIFO 306, and the transmitted frames are received in a network FIFO 308. Reaction point 302 transmits the frames at a 10 Gbit rate. Network FIFO 308 has a flow control threshold 310, which is not exceeded. The frames in network FIFO 308 are forwarded, and the forwarded frames are received in a network FIFO 312. Network FIFO 312 includes a flow control threshold 314, which is not exceeded. The frames in network FIFO 312 are forwarded, and the forwarded frames re received in a network FIFO 316. The frames in network FIFO 316 are forwarded at a 1 Gbit rate. Network FIFO 316 includes a flow control threshold 318, which is exceeded, thereby making network FIFO 316 an overload point. In this example, MTD for network FIFO 316 is indicated at 320, TFS is indicated at 322, and TTS is indicated at 324.

At time $t_0$, overload point 304 receives a frame $f_0$ that pushes network FIFO 316 past flow control threshold 318, thereby generating a backward flow control notification message $BFCN_0$ 330 including a pause duration $PD_0$ indicated at 326 to be sent to reaction point 302. At time $t_0$+TTS, reaction point 302 receives $BFCN_0$ 330 and starts pausing transmission of frames (as indicated by stopwatch 334) for $PD_0$ 326. Past time $t_0$+TTS, in response to each additional frame $f_1$ though $f_n$, additional backward flow control notification messages $BFCN_1$ through $BFCN_n$ 332 arrive at reaction point 302 with pause durations $PD_1$ through $PD_n$ indicated at 328, respectively. At time $t_n \approx t_0$+TTS+TFS, traffic from reaction point 302 will stop arriving at overload point 304 until time $t_n$+(TTS+TFS+$PD_n$) given the source FIFO 306 is delivering constantly at its maximum capacity (e.g., a 10 Gbit rate) and all potential overload points are operating below their flow control thresholds except for the destination FIFO.

The pause delay seen at overload point 304 is sufficient to drain FIFO 316. In one example, the drain time MTD=TTS+TFS+$PD_n$. Therefore, $PD_n$=MTD−(TTS+TFS), which is independent from the sourced bandwidth. If TTS+TFS is set to zero, there is no overrun risk of FIFO 316, however, throughput is reduced.

Figure 8:
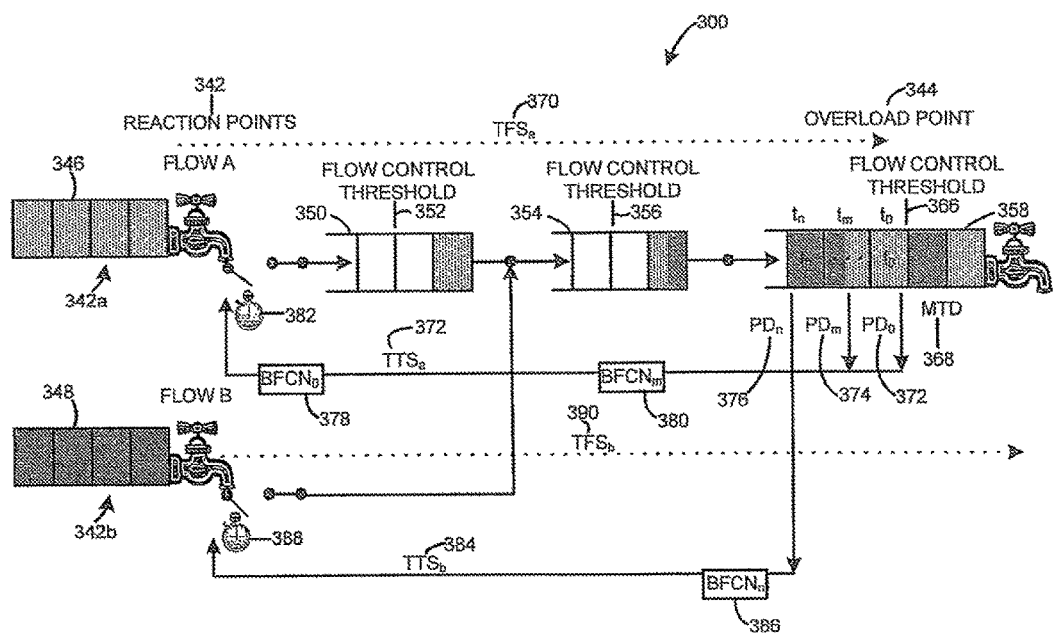
FIG. 8 is a diagram illustrating one example of quantum flow control where flows from different reaction points merge.

FIG. 8 is a diagram illustrating one example of quantum flow control 340 where flows from different reaction points 342 merge. Reaction point 342a for flow A transmits frames in a source FIFO 346, and the transmitted frames are received in a network FIFO 350. Network. FIFO 350 has a flow control threshold 352, which is not exceeded. The frames in network FIFO 350 are forwarded, and the forwarded frames are received in a network FIFO 354. Reaction point 342b for flow B transmits frames in a source FIFO 348, and the transmitted frames are received in network FIFO 354. The frames from reaction point 342a and from reaction point 342b are merged in network FIFO 354.

Network FIFO 354 has a flow control threshold 356, which is not exceeded. The frames in network FIFO 354 are forwarded, and the forwarded frames are received in a network FIFO 358. Network FIFO 358 includes a flow control threshold 366, which is exceeded, thereby making network FIFO 358 an overload point. In this example, MTD for network FIFO 358 is indicated at 368, the time from source for Flow A is indicated by $TFS_a$ 370, the time from source for Flow B is indicated by $TFS_b$ 390, the time to source for Flow A is indicated by $TTS_a$ 372, and the time to source for Flow B is indicated by $TTS_b$ 384.

At time $t_0$, overload point 344 receives a frame $f_0$ from reaction point 342a for Flow A that pushes FIFO 358 past flow control threshold 366, thereby generating a backward flow control notification message $BFCN_0$ 378 including a pause delay $PD_0$ indicated at 372 to be sent to reaction point 342a. At time $t_m$ overload point 344 receives the last frame $f_m$ from reaction point 342a for Flow A, thereby generating a backward flow control notification message $BFCN_m$ 380 for Flow A including a pause delay $PD_m$ indicated at 374 to be sent to reaction point 342a. At time $t_n$, overload point 344 receives the last frame $f_n$ from reaction point 342b for Flow B, thereby generating a backward flow control notification message $BFCN_n$ 386 for Flow B including a pause delay $PD_n$ indicated at 376 to be sent to reaction point 342b. At time $t_0+TTS_a$, reaction point 342a receives $BFCN_0$ 378 and starts pausing transmission of frames (as indicated by stopwatch 382) for $PD_0$ 372. At time $t_m+TTS_a$, reaction point 342a receives $BFCN_m$ 380 and starts pausing transmission of frames (as indicated by stopwatch 382) for $PD_m$ 374 or continues pausing for the maximum of $PD_m$ or the remaining duration of a previous BFCN. At time $t_n+TTS_b$, reaction point 342b receives $BFCN_n$ 386 and starts pausing transmission of frames (as indicated by stopwatch 388) for $PD_n$ 376.

At time $t_m \approx t_0+TTS_a+TFS_a$, traffic from reaction point 342a will stop arriving at overload point 344 until time $t_m+(TTS_a+TFS_a+PD_m)$. At time $t_n \approx t_0+TTS_b+TFS_b$, traffic from reaction point 342b will stop arriving at overload point 344 until time $t_n+(TTS_b+TFS_b+PD_n)$. The pause delay seen at overload point 344 from reaction point 342a is approximated by taking time $MTD_m=TTS+TFS_a+PD_m$ and solving for $PD_m$ giving $PD_m=MTD_m-(TTS_a+TFS_a)$. The pause delay seen at overload point 344 from reaction point 342b is approximated by taking time $MTD_n=TTS_b+TFS_b+PD_n$ and solving for $PD_n$ giving $PD_n=MTD_n-(TTS_b+TFS_b)$.

Figure 9:
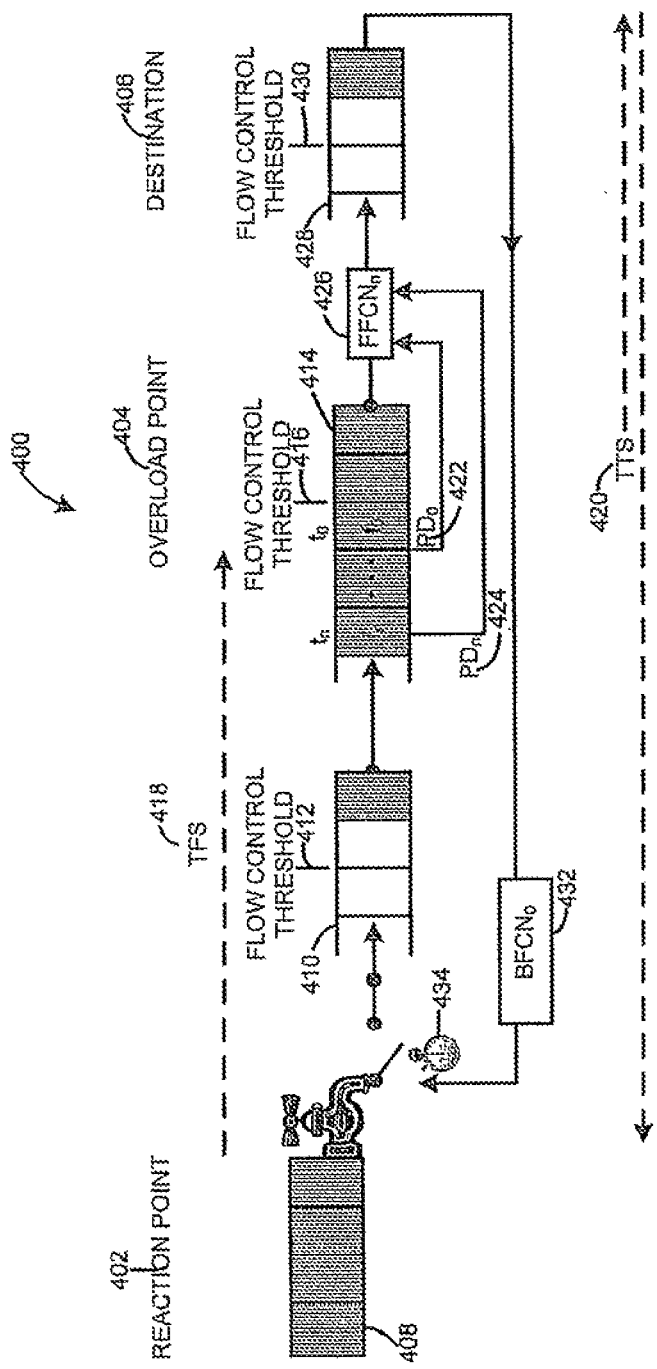
FIG. 9 is a diagram illustrating one example of quantum flow control including forward flow control notification messages.

FIG. 9 is a diagram illustrating one example of quantum flow control 400 including forward flow control notification messages. Quantum flow control 400 involves a reaction point 402, an overload point 404, and a destination 406. Reaction point 402 transmits frames in a source FIFO 408, and the transmitted frames are received in a network FIFO 410. Network FIFO 410 has a flow control threshold 412, which is not exceeded. The frames in network FIFO 410 are forwarded, and the forwarded frames are received in a network FIFO 414. Network FIFO 414 includes a flow control threshold 416, which is exceeded, thereby making network FIFO 414 overload point 404. The frames in network FIFO 414 are forwarded, and the forwarded frames are received in a destination FIFO 428. Destination FIFO 428 has a flow control threshold 430, which is not exceeded. In this example, TFS is indicated at 418 and TTS is indicated at 420.

At time $t_0$, overload point 404 receives a frame $f_0$ that pushes network FIFO 414 past flow control threshold 416, thereby generating a forward flow control notification message $FFCN_0$ including a pause delay $PD_0$ indicated at 422 to be sent to reaction point 402. In response to each additional frame $f_1$ though $f_n$, additional forward flow control notification messages $FFCN_1$ through $FFCN_n$ 426 are generated and sent to reaction point 402 with pause delays $PD_1$ through $PD_n$ indicated at 424, respectively. The forward flow control notification messages are received at the destination 406. Destination 406 then converts each forward control notification message into a backward flow control notification message as indicated by $BFCN_0$ 432. At time $t_0+TTS$, reaction point 402 receives $BFCN_0$ 432 and starts pausing transmission of frames (as indicated by stopwatch 434) for $PD_0$ 422. At time $t_n \approx t_0+TTS+TFS$, traffic from reaction point 402 will stop arriving at overload point 404 until time $t_n+(TTS+TFS+PD_n)$.

Figure 10A:
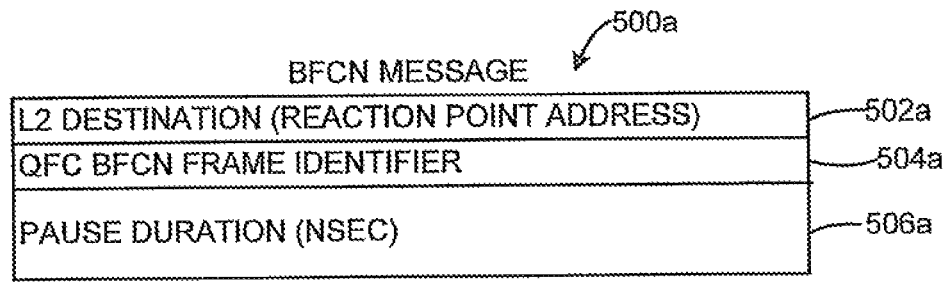
FIG. 10A is a list illustrating one example of the contents of a backward flow control notification message.

FIG. 10A is a list 500a illustrating one example of the contents of a BFCN message. In this example, the BFCN message includes a Layer 2 (L2) destination (i.e., reaction point address) 502a, a Quantum Flow Control (QFC) BFCN frame identifier 504a, and a pause duration in nanoseconds 506a.

Figure 10B:
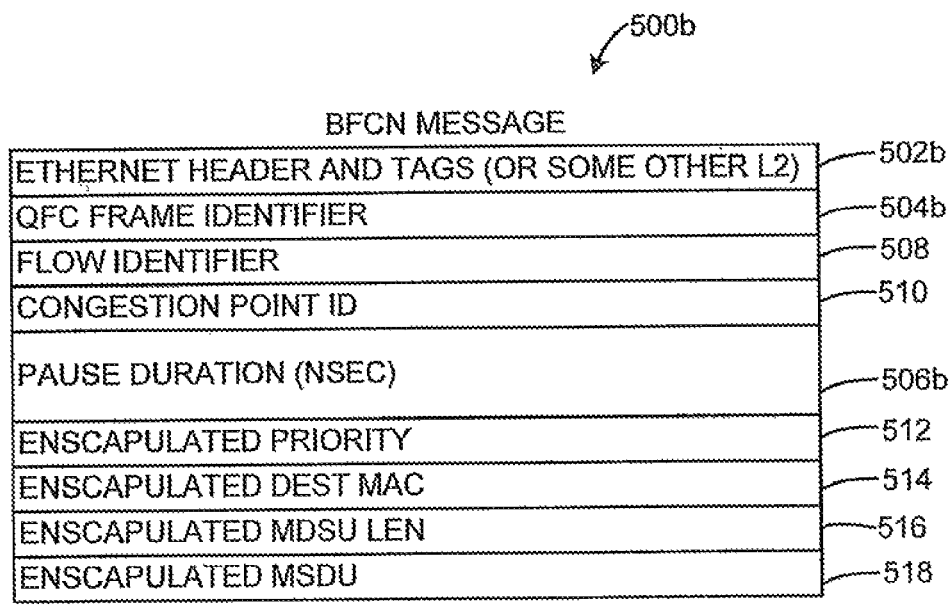
FIG. 10B is a list illustrating another example of the contents of a backward flow control notification message.

FIG. 10B is a list 500b illustrating another example of the contents of a BFCN message. In this example, the BFCN message includes an Ethernet Header and Tags or other L2 information 502b, a QFC frame identifier 504b, and a pause duration in nanoseconds 506b. Items 502b, 504b, and 506b are similar to items 502a, 504a, and 506a, respectively, as previously described and illustrated with reference to FIG. 10A. In addition, the BFCN message may include one or more of the following: a flow identifier 508, a congestion point identifier 510, an encapsulated priority 512, an encapsulated destination Media Access Control (MAC) address 514, an encapsulated MAC Service Data Unit (MSDU) length 516, and an encapsulated MSDU 518.

Figure 11:
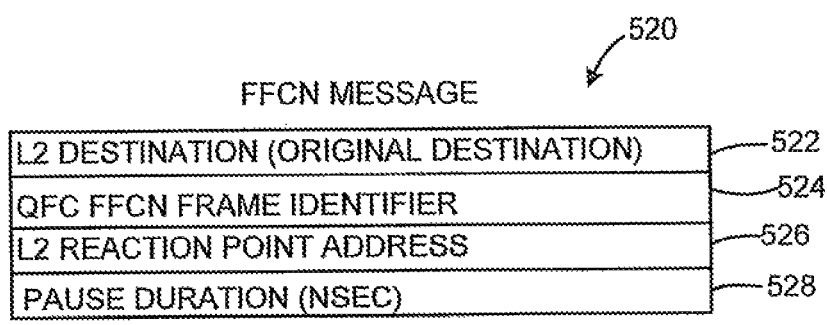
FIG. 11 is a list illustrating one example of the contents of a forward flow control notification message.

FIG. 11 is a list 520 illustrating one example of the contents of a Forward Flow Control Notification (FFCN) message. In this example, the FFCN message includes an L2 destination (i.e., original destination) 522, a QFC FFCN frame identifier 524, an L2 reaction point address 526, and a pause duration in nanoseconds 528.

Quantum flow control as described herein provides a very fast response and is therefore able to operate with small switch buffers common in single chip switch solutions. Quantum flow control responds effectively to transient overloads and short lived flows. Quantum flow control does not use per flow state in the switches and can manage congestion at a series of switch hops. Further, quantum flow control allows all flows to start at full rate, thereby reducing the effective transmission latency. In addition, quantum flow control can manage congestion of a multicast flow without any special consideration.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that his disclosure be limited only by the claims and the equivalents thereof.

What is claimed is:

1. A network device comprising: a queue to receive frames from a source;
   a processor;
   and a memory communicatively coupled to the processor, the memory storing instructions executable on the processor to;
   determine whether a flow control threshold of the queue has been exceeded;
   in response to determining that a frame from the source has caused the flow control threshold of the queue to be exceeded, calculate a pause duration based on a time to drain the queue and a latency time to deliver a control message from the network device to the source;
   and generate a message including the calculated pause duration to cause the source to stop transmitting frames to the network device,
   wherein the calculated pause duration is further based on a latency time to deliver traffic from the source to the network device and die time to drain the queue minus the latency time to deliver a control message from the network device to the source, and minus the latency time to deliver traffic from the source to the network device.

2. The network device of claim 1, wherein the instructions are executable on the processor to generate an additional message to be sent to the source of each additional frame that causes the flow control threshold of the queue to be exceeded.

3. The network device of claim 1, wherein the queue is a First In First Out (FIFO) to forward received frames to at least one destination.

4. The network device of claim 1, wherein the generated message is a backward flow control notification message, and wherein the instructions are executable on the processor to send the backward flow control message including the calculated pause duration to the source.

5. The network device of claim 1, wherein the generated message is a forward flow control notification message, and wherein the instructions are executable on the processor to send the forward flow control notification message including the calculated pause duration to a destination device to cause the destination device to send, to the source, a backward flow control notification message based on the forward flow control notification message.

6. The network device of claim 1, wherein the instructions are executable on the processor to:
   send, after sending the generated message, a further message to the source in response to another frame from the source that causes the flow control threshold of the queue to be exceeded, the further control message including a different pause duration.

7. The network device of claim 1, wherein the instructions are executable on the processor to receive frames transmitted by the source at full rate after the source has stopped transmitting for the pause duration.

8. A first network device comprising;
   a processor;
   and a memory communicatively coupled to the processor, the memory storing instructions executable on the processor to:
   receive, from a second network device comprising a queue, a forward flow control notification message including a pause duration, the forward flow control notification message responsive to a frame from a source causing a flow control threshold of the queue to be exceeded;
   generate a backward flow control notification message based on the forward flow control notification message;
   and send, to the source, the backward flow control notification message to pause transmission of frames for the pause duration at the source,
   wherein the pause duration is based on a latency time to deliver traffic from the source to the second network device and the time to drain the queue minus the latency time to deliver a control message from the second network device to the source, and minus the latency time to deliver traffic from the source to the second network device.

9. The first network device of claim 8, wherein the first network device is a destination network device, and the second network device is a switch.

10. The first network device of claim 8, wherein the pause duration included in the forward flow control notification message received from the second network device is sufficient to drain the queue of the second network device.

11. A method for controlling the flow of frames through a network, the method comprising:
    calculating, by a network device, a pause duration that is based on a time to drain a queue in die network device and a latency time to deliver a control message to a source;
    generating, at the network device, a flow control notification message to be sent to the source of a frame that caused a flow control threshold of the queue to be exceeded, the flow control notification message including the calculated pause duration;
    and sending, by the network device, the flow control notification message including the calculated pause duration over the network to cause the source to stop transmitting frames for the pause duration,
    wherein the calculated pause duration is based on the time to drain the queue minus tire latency time to deliver a control message from the network device to die source, and minus a latency time to deliver traffic from the source to the network device.

12. The method of claim 11, wherein generating the flow control notification message comprises generating a backward flow control notification message, the method further comprising sending, by the network device, the backward flow control notification message to the source.

13. The method of claim 11, wherein generating the flow control notification message comprises generating a forward flow control notification message, the method further comprising:
    sending, by the network device, the forward flow control notification message including the calculated pause duration to a destination device to cause the destination device to send, to the source, a backward flow control notification message based on the forward flow control notification message.

* * * * *